UNITED STATES PATENT OFFICE.

HERMAN F. WILLKIE, OF BALTIMORE, MARYLAND, ASSIGNOR TO U. S. INDUSTRIAL ALCOHOL CO., A CORPORATION OF WEST VIRGINIA.

VARNISH, PAINT, OR CEMENT AND PROCESS OF MAKING THE SAME.

1,408,325.  Specification of Letters Patent.  Patented Feb. 28, 1922.

No Drawing.  Application filed April 12, 1920. Serial No. 373,083.

*To all whom it may concern:*

Be it known that I, HERMAN F. WILLKIE, a citizen of the United States, residing at Baltimore, in the State of Maryland, have invented a certain new and useful Improvement in Varnish, Paint, or Cement and Processes of Making the Same, of which the following is a specification.

My invention relates particularly to a varnish, paint or cement of an advantageous character, and the process involved in producing said varnish, paint or cement, my invention being applicable to the production of varnishes and paints of many different varieties.

The object of my invention is to provide varnishes, paints and cements and to use in the production of the same a process of an advantageous character, whereby varnishes and paints are obtained producing hard films, taking a remarkable polish, which are free from water as well as pores, and which are so compact as not to be readily penetrated by oils or other liquids. The object of my invention is thus to provide varnishes, paints and cements, using as a solvent one or more esters, alcohols, ethers, or ketones alone or mixed together, which are of such a character that the solvent in evaporating will carry off the water contained in the composition to such an extent as to obviate leaving behind a film containing particles of water, the presence of which would eventually produce pores in the film. A further object is to use a solvent that will form with water a constant boiling mixture, so that the water will most effectively evaporate with the solvent. Still another object is to remove substantially all the water present in the solvent itself, in the dissolved solids and other liquids, and which is taken up from the atmosphere owing to the hygroscopic character of the solvent used. A further object is to use ethyl acetate as one of the solvent constituents notwithstanding its great avidity for moisture.

Further objects of my invention will appear from the detailed description thereof contained hereinafter.

While my invention is capable of embodiment in many different forms, for the purpose of illustration I shall describe only certain forms of my invention hereinafter.

For example, in making a varnish, the varnish may be any one of the many different varieties of varnishes in which volatile constituents are used, and as one illustration, I shall describe one such varnish.

A varnish may be made containing any one of a number of resins, such for instance as sandarac, copal, dammar, benzoin, elemi, colophony, or coumarone resin, dissolved in any one or more of the solvents having the characteristics above referred to. For instance, I may dissolve in any suitable manner 40 parts by weight of coumarone resin, in 100 parts by weight of a solvent mixture comprised of 98% by weight of ethyl ecetate, and 2% by weight of alcohol, having a strength of 95%.

To this, if desired, there may be added 50 parts by weight of turpentine, the turpentine acting partly as a thinner and partly as a drier. When the varnish has thus been formed, it is set aside to settle, so that any solid undissolved particles may settle out, after which the varnish is ready for use. It will be understood that to this there may be added any desired quantity of pigments or coloring materials, such as are customarily added in the production of varnishes. The varnish when applied to a surface to be coated will dry very rapidly, owing to the rapid evaporation of the ethyl acetate. The ethyl acetate in evaporating will carry off with it the alcohol and water present, inasmuch as the ethyl acetate forms a constant boiling mixture therewith having a composition containing 83% by weight of ethyl acetate,
8% by weight of alcohol, and
9% by weight of water, when there is sufficient alcohol and water present. In this way, not only the water that was originally present in the solvent mixture will be removed, but also the water which is present in the solid materials dissolved in the solvent, as well as any water which is taken up from the atmosphere. The films formed in this manner will be found entirely clear and free from cloudiness and will, therefore, have a uniform color.

As another example of my invention, I may make a paint containing 20 parts by weight of boiled linseed oil,
20 parts by weight of a solvent mixture, comprising
  98% by weight of ethyl acetate, and
  2% by weight of alcohol, having a strength of 95%.
10 parts by weight of turpentine,
100 parts by weight of a pigment, such for example as white lead.

This composition may also contain 10 parts by weight of a resin, such for example as copal. These constituents may be made into a homogeneous composition in any desired manner by passing them through a mixing machine, and then through a paint grinding machine. The solvent mixture in evaporating vaporizes in the same manner described in connection with the first example of my invention.

Another example of my invention would be a cement comprised of 35 parts by weight of shellac
100 parts by weight of a solvent mixture containing
  60% by weight of ethyl acetate
  40% by weight of alcohol having a strength of 95%,
to which there is added 10 parts by weight of whiting. In this composition the whiting is a body giving material. Instead of the whiting I may use calcium sulfate or other body giving materials. Also other constituents may be added if desired such as pigments, etc.

In the above compositions the proportions of the ethyl acetate in the solvent mixture may vary considerably, and may be higher or lower, or even as low as 40%, the proportion of the alcohol being increased in that event to 60%. The alcohol may be entirely absent, or may be substituted by any other liquid which would not be detrimental to the solvent action of the ethyl acetate as for example benzol. It will also be understood that the proportions of the other constituents present may be varied to a considerable degree. Instead of the ethyl acetate, I may substitute one or more other solvents that may have a dehydrating action, as for example, one or more esters other than ethyl acetate, one or more alcohols other than alcohol, and one or more ethers or ketones. For example, instead of the ethyl acetate, I may use benzol, amyl alcohol, amyl acetate, iso-butyl alcohol or iso-propyl alcohol.

The solvent which evaporates while the films or coatings are drying or hardening may be recovered in any suitable manner, as by collecting and condensing the same, and the condensate may be used over again several times for the production of films. When the solvent mixture has accumulated a considerable percentage of water, however, it may be treated in any suitable manner for the removal of some of the water, so as to permit the solvent mixture to be used over again in the production of coatings, or the solvent mixture containing water may be used in some other industry without the removal of water therefrom, as for example, in extracting oils, fats, and waxes.

The coatings thus produced in the foregoing examples of my invention leave behind hard compact films that are capable of taking a very high polish, and which are free from water as well as pores, and the films are of such a character as not to be readily penetrated by oils.

While I have described my invention above in detail, I wish it to be understood that many changes may be made therein without departing from the spirit thereof.

I claim:

1. A resinous coating material comprising a solvent containing ethyl acetate and alcohol adapted to carry off water during the evaporation thereof.

2. A resinous coating material comprising a solvent containing ethyl acetate and alcohol adapted to carry off water during the evaporation thereof in such a manner as to avoid leaving water in the resulting film after the solvent has evaporated.

3. A coating material comprising a resin and a solvent containing ethyl acetate and alcohol adapted to carry off water during the evaporation thereof.

4. A coating material comprising a resin and a solvent containing ethyl acetate and alcohol adapted to carry off water during the evaporation thereof in such a manner as to avoid leaving water in the resulting film after the solvent has evaporated.

5. A coating material comprising a resin turpentine, a drying oil, and a solvent adapted to carry off water during the evaporation thereof.

6. A coating material comprising a resin, a drying oil, and a solvent adapted to carry off water during the evaporation thereof in such a manner as to avoid leaving water in the resulting film after the solvent has evaporated.

7. A coating material comprising a resin, a drying oil, and a solvent containing ethyl acetate adapted to carry off water during the evaporation thereof.

8. A coating material comprising a resin, a drying oil, and a solvent containing ethyl acetate adapted to carry off water during the evaporation thereof in such a manner as to avoid leaving water in the resulting film after the solvent has evaporated.

9. A coating material comprising a resin, a drying oil, and a solvent containing ethyl acetate and alcohol adapted to carry off water during the evaporation thereof.

10. A coating material comprising a resin, a drying oil, and a solvent containing ethyl acetate and alcohol adapted to carry off water during the evaporation thereof in such a manner as to avoid leaving water in the resulting film after the solvent has evaporated.

11. A coating material comprising a resin, a drying oil, turpentine, a pigment, and a solvent containing ethyl acetate and alcohol adapted to carry off water during the evaporation thereof.

12. A coating material comprising a resin, a drying oil, turpentine, a pigment, and a solvent containing ethyl acetate and alcohol adapted to carry off water during the evaporation thereof in such a manner as to avoid leaving water in the resulting film after the solvent has evaporated.

13. A coating material comprising a resin, turpentine, and a solvent containing ethyl acetate adapted to carry off water during the evaporation thereof.

14. A coating material comprising a resin, turpentine, a drying oil, and a solvent adapted to carry off water during the evaporation thereof.

In testimony that I claim the foregoing, I have hereunto set my hand this 11th day of March, 1920.

HERMAN F. WILLKIE.